United States Patent [19]

Zillgitt et al.

[11] 4,162,424
[45] Jul. 24, 1979

[54] LOAD TRIM COMPENSATING VEHICLE HEADLIGHT DEFLECTION SYSTEM

[75] Inventors: Ulrich Zillgitt, Stuttgart; Wolfgang Kuhn, Waiblingen; Günther Doll, Stuttgart, all of Fed. Rep. of Germany

[73] Assignee: Robert Bosch GmbH, Stuttgart, Fed. Rep. of Germany

[21] Appl. No.: 826,703

[22] Filed: Aug. 22, 1977

[30] Foreign Application Priority Data

Sep. 1, 1976 [DE] Fed. Rep. of Germany ....... 2639263

[51] Int. Cl.$^2$ ............................................. B60Q 1/02
[52] U.S. Cl. ................................. 315/82; 307/10 LS; 362/71
[58] Field of Search ................... 307/10 LS; 340/686, 340/689; 362/37, 43, 66, 71, 802; 315/77, 82

[56] References Cited

U.S. PATENT DOCUMENTS 3,328,571 6/1967 Cibie ....................................... 362/71
3,989,954 11/1976 Weiner .............................. 307/10 LS Primary Examiner—Alfred E. Smith
Assistant Examiner—Robert E. Wise
Attorney, Agent, or Firm—Frishauf, Holtz, Goodman & Woodward

[57] ABSTRACT

A command transmitter is in the form of a step switch with a progressive bridging contact, the individual contacts of the step switch being connected to individual contacts of a contact array over which a slider mounted on the drive rod that actuates the headlight elevation position slides. The inertia of the moving drive rod carries the slider beyond the last energized contact of the array. If a single contact array is used, a restoring spring pushes back the drive rod until it again touches an energized contact and the drive executes a hunting movement that is designed to provide no appreciable disturbence of the headlight position. When a second contact array and slider are used, in cooperation with a second set of contacts and a second bridging contact at the command transmitter, a reversible drive is used and there is no hunting movement. A non-reversible drive is provided by an expansion chamber drive controlled by an electrical heater. A reversible electric motor is used in the reversible drive.

12 Claims, 4 Drawing Figures

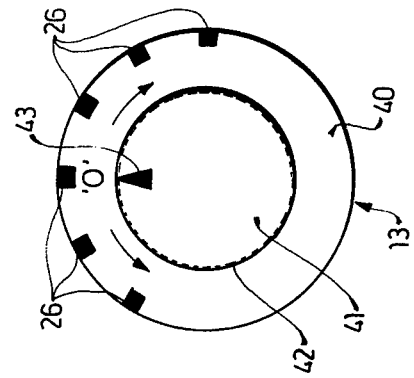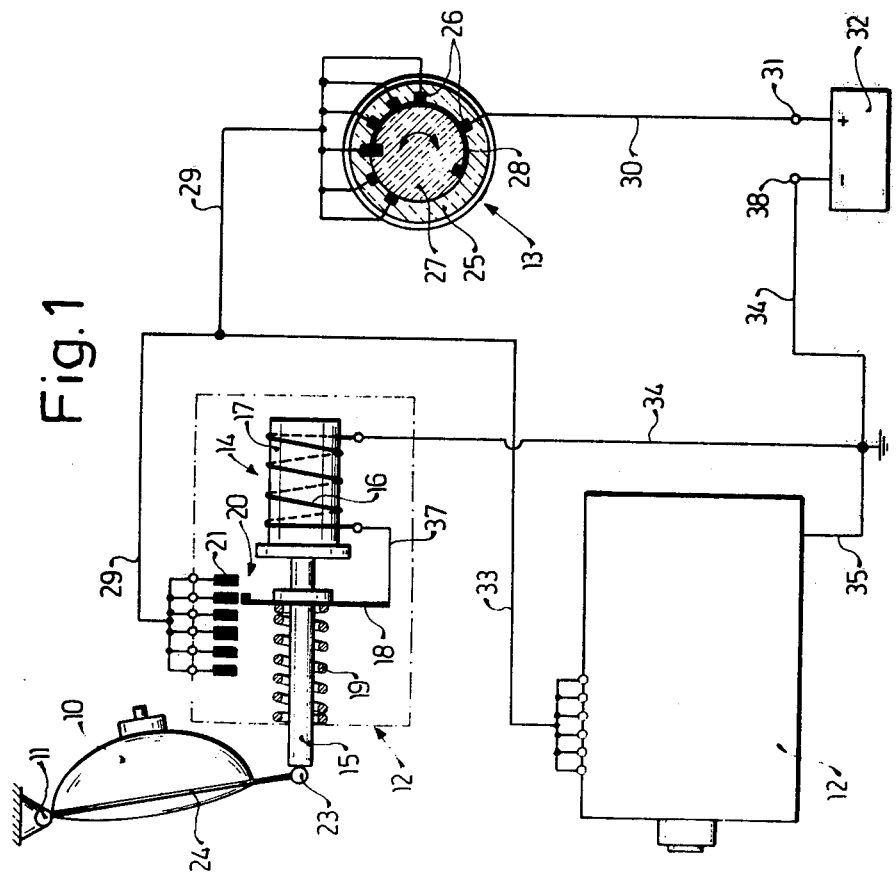

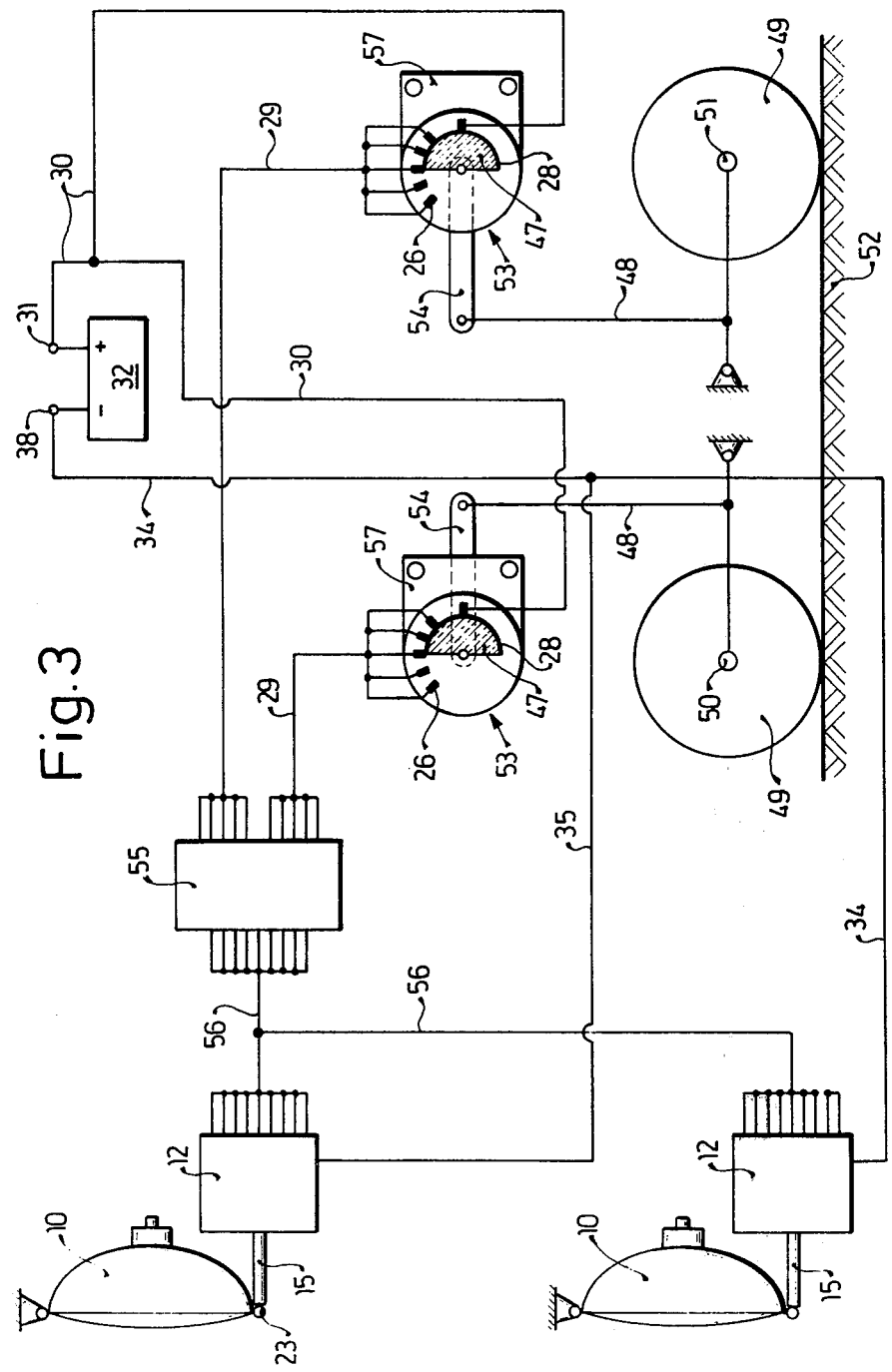

4,162,424

LOAD TRIM COMPENSATING VEHICLE HEADLIGHT DEFLECTION SYSTEM

This invention relates to a headlight deflecting system for a vehicle by which the headlight reflectors, or the entire headlights, can be adjusted in the vertical plane in response to a change in the vehicle loading so that the projected light beam will have the optimum range without being projected at an excessively high angle.

Such systems are known in which a pitch angle control causes an expansion-chamber drive to position the headlight reflectors angularly by controlling an electric heating element that causes the expansion medium to expand. The actuator of such systems swings the reflector about a pivot against the force of a spring, and the drive, which may be a piston drive, either operates individually on each reflector or centrally with a common steering member for both reflectors. It is also know to operate a positioning member in such a system with an electric motor that can be operated to turn in either direction.

Instead of an automatic pitch sensor, a manual elevation angle control can be used. It is also known to use two pitch angle sensors and to combine their outputs additively to provide a sum or average signal which is then supplied to the positioning device.

In all the positioning devices used in these known systems above described, however, a so called actual value indication device is needed for the unambiguous indication of the position of the driving member of the positioning device to be compared with the state of vehicle loading at the time or with the position of the manual elevation control. Furthermore, additional devices such as limit switches and potentiometers or other resistances are necessary.

It is an object of the present invention to provide a headlight elevation control that is simpler and more practical than those used heretofore and in particular to improve the output or positioning portion of the servo system involved.

SUMMARY OF INVENTION

Briefly, a positioning member for a headlight elevation control system utilizing electric connections between the transmitting and receiving portions of the system is provided in a form that man make use of the kinetic energy of the operating positioning member in order to accomplish the desired positioning. More particularly, the transmitting device of the system, namely the pitch angle sensor or a manual elevation control is provided in the form of a step switch, contacts of which are connected respectively to an array of contacts in the receiving or positioning member of the system, forming a slide switching path and insulated frm each other, along which a slider contact that is part of the drive element of the system slides. This arrangement results in producing in effect digital pulses, so that the control system has the benefit of the advantages of this type of pulses. In the case of a positioning device using an electrically heated expansion chamber drive, the drive rod of the positioning member is suspended between the last voltage-carrying contact piece and the nearest non-energized contact piece of the slide path contact array, being helped between these in a manner similar to the operation of a control system utilizing an actual value indicator providing a feed-back signal for comparison with the command signal to produce an error signal drive.

The same advantages are available in the case an electric-motor-driven positioning device if the same step switch arrangement is used. A particularly simple and reliable system for this case is provided where the transmitting portion of the system, namely the sensor or manual control, comprises a disc having at least a portion of its circumference toothed, and the tongue of a leaf-spring switch rides on this portion of the disc so as to be actuated thereby to operate a reversing switch controlling the direction of motor operation.

The invention is further described by way of illustrative examples with reference to the annexed drawings, in which:

FIG. 1 is a simplified circuit diagram of a first embodiment of a control system using an expansion chamber drive;

FIG. 2 is a front view of the scale divisions of a manual elevation control for the system of FIG. 2;

FIG. 3 is a circuit diagram of a control sytem also using an expansion chamber drive for the positioning device, in which system pitch angle sensors are provided for the axles of a vehicle, to measure pitch relative to the wheel base.

Figure 4:
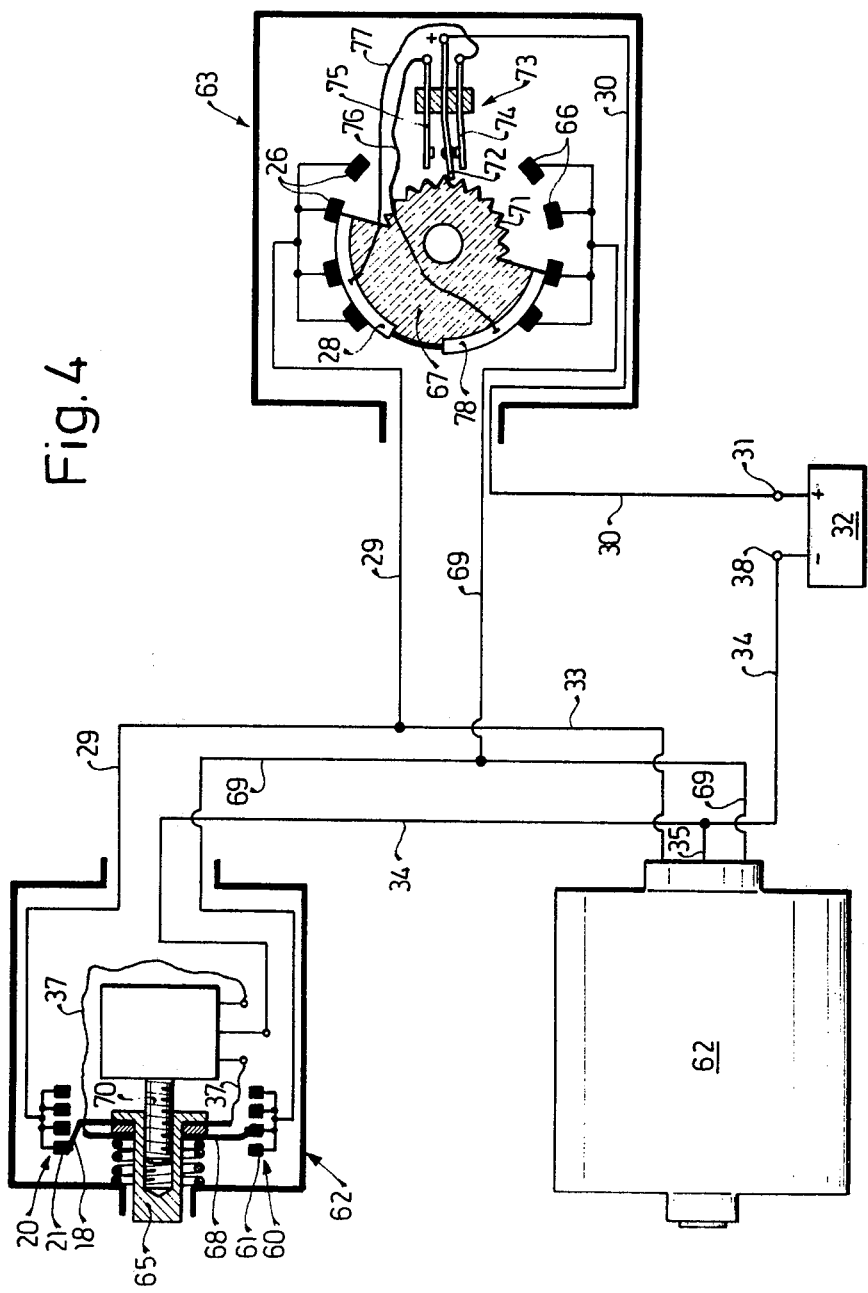
FIG. 4 is a circuit diagram of another embodiment of control system utilizing an electric positioning motor for the positioning member of the system.

The vehicle headlight elevation control system illustrated in FIG. 1 controls the elevation position of two pivoted headlights 10 each typical of being swung about an axis 11, only one of which is represented, and consists of a positioning member 12 linked to each headlight 10 and a common command transmitter 13, as well as the necessary electrical interconnections.

Each positioning member 12 comprises an expansion chamber drive 14 having a drive rod 15 equipped with a return spring 19. Each expansion chamber drive 14 is equipped with a heating winding 16 surrounding the expansion chamber casing 17.

In accordance with the invention, a finger-like slider 18 is affixed to the drive rod 15 and slides along a fixed slide path 20 as the drive rod 15 alters its position. The slide path 20 is formed by a linear array of 6 mutually insulated contact pieces 21, to which six separate conductors 19 are connected for inter-connection with the command transmitter 13. The pivot joint 23 provides a mechanical connection between the drive rod 15 and the lever 24 pivoted on the axis 11 about which the headlight 10 swings. A similar positioning member 12 or the second headlight as shown in FIG. 1 only symbolically with a blank rectangle. It is constituted in the same way as the other positioning member and it operates the second headlight (not shown) in the same way.

The command transmitter 13 is constituted as a manually operable step switch and comprises a shell body 25 and a disc or plug 27 rotatable therein that provides a contact bridge 28 for selectively bridging adjacent contacts among the six contacts 26 set on the inside surface of the shell body 25 in an approximately semicircular array. Each of the six conductors 29 connects one of the contacts 26 of the command transmitter 13 with one of the contact pieces 21 of the slide path 20 in the positioning member. A seventh switch contact 26 is likewise set in the inner surface of the shell body 25 and is connected electrically by the conductor 30 with the positive terminal 31 of the battery 32. The second positioning member 12 shown as a blank rectangle in FIG.

1 is connected in parallel with the first by six conductors 33. The negative terminal 38 of the battery 32 is connected through a conductor 34 to the heating winding 16, the other end of which is electrically connected with the slider contact 18 of the drive rod 15 through a flexible conductor 37. In the same manner, a parallel connection 35 leads to the second positioning member 12.

A front view of the command transmitter 13 is shown in FIG. 2. This device consists of a fixed scale member 40 that may, for example, be affixed to the dashboard of the vehicle; and a knob rotor 41 which is maintained in the position in which it is manually set by serrations 42 that cooperate with indexing features (not shown) of the scale 40. The knob rotor 41 carries an index 43 showing its position with respect to the scale 40. The angular positions of the switch contacts 26 are indicated on the scale member 40 and corresponding positions. One of them, ususally at the top of the scale is marked "0" to signify the normal position specifed by law or regulation for traffic for normal trim of the vehicle, while the two positions to the left and the three to the right signify relatively greater loading of the forward axle in the first case and relatively greater loading of the rear axle in the second. Rotating the hand knob 41 to the left accordingly produces a raising of the headlight beam elevation angle and rotation to the right from the "0" position indicates a depression of the beam, in each case to compensate for the loading trim of the vehicle.

The headlight control system above described operates as follows: assuming first a maximum rear axle loading of the vehicle, in which only the outer right-hand contact piece 21 is energized and the drive rod 15 and its slider contact 18, and likewise the headlight 10, have the position shown in FIG. 1.

If now, the vehicle is unloaded, the command transmitter 13 is rotated into its null position indicated in FIGS. 1 and 2, as a result of which three additional switch contacts 26 and hence the neighboring contact pieces 21 of the positioning member 12 are supplied with voltage. The heating winding 16 consequently heats up the expansion chamber motor 12 so that its drive rod 15 moves outwards. On account of the kinetic energy of the drive rod 15, the slider 18 overshoots the last contact piece 21 that has voltage applied to it and thereby switches through the transmitter pulse to the positioning member 12, i.e. the control drive is switched off and the heating winding 16 cools. Thereupon the spring 19 presses the drive rod 15 back into the casing 17, so that the slider 18 touches the nearest energized contact piece 21 and thereby recloses the circuit which results in a renewed heating of the expansion chamber drive 14 and renewed outward movement of the drive rod 15. The switching on and off of the voltage leads to a continuous hunting of the slider 18 in the manner just described. This hunting can be so adjusted by exact determination of the individual parameters of the system that a disturbing oscillation of the headlights 10 does not occur.

FIG. 3 shows two controlled headlights 10 each with a positioning member 12 connected thereto, but with the difference in this case that an automatic elevation control sensor 53 constituted as a step switch is provided in the neighborhood of the front axle 50 and another in the neighborhood of the rear axle 51. The pacing 57 of the sensors 53 is affixed to the body or fram of the vehicle and a lever 54, that carries the disc 47 with the contact bridge 28, is in the one case linked to the front axle by a link member 48 and in the other case linked to the rear axle through another link member 48. The vehicle wheels 49 are shown in the figure and likewise the road level 52. Since the vehicle frame or body is supported on springs bearing on the two axles, the sum of the angles thus sensed will indicate the "pitch" inclination of the vehicle body relative to the roadway. An addition stage 55 receives signals over the conductors 29 and provides a sum signal over the conductors 56 to the two positioning members 12 of the respective headlights 10.

FIG. 4, in which similar parts are designated by the same reference numerals as in the above described figures, shows a control system in which the command transmitter is an electrically actuatable step switch 63 and the two positioning members are each an electric positioning motor 62 that can be operated in either direction of rotation. The motor shaft 70 has an external screw thread and cooperates with internal threading of the nonrotatable drive rod 65, so that the latter is driven in or out according to the direction of rotation of the positioning motor 62. The drive rod 65 carries the slide 18 that cooperates with the slide path 20 in the above described way and a second slider 68 is affixed in a similar way to work with a second slide path 60 and is connected by the conductor 37 with the positioning motor 62, the contacts 61 of the second slide path 60 each being connected by a conductor 69 to the step switch 63.

The step switch 63 consists essentially of the disk 67 which carries first and second fixedly coupled contact bridges 28 and 78 that cooperate with the switch contacts 26 and 66 respectively in the previously described way. The disk 67 has circumferentially disposed teeth 71 against which presses the switching tongue of a leaf spring contact assembly 73, so that the tongue makes contact either with the contact 74 or with the contact 75 according to the direction of rotation of the disk 67. The conductor 30 connects the positive terminal 31 of the battery 32 with the switch tongue 72. The conductors 76 and 77 connect the contact 75 with the contact bridge 68 and the contact 74 respectively with the contact bridge 28. FIG. 4 shows the particular position in which the disk 67 executes rotation to the right and consequently presses the switch tongue 72 against the contact 74, so that the contact bridge 28 applies voltage, through the left three switch contacts 26, to the three right had contact pieces 21 of the slide path 20. The contact bridge 78 is in this case not energized. The drive rod 65, on account of its kinetic energy as it moves outward of the positioning member 62 overshoots the last energized contact and accordingly its slider has come to rest—as illustrated—on the neighboring non-energized contact, so that the circuit is interrupted. The two headlights 10 (FIG. 1) each coupled to a drive rod 65 accordingly take the new elevation angle with respect to the vehicle body.

If, for example, the headlights are to be swung into opposite directions, the hand knob 41 will be rotated counter-clockwise, so that the switch tongue 72 of the reversing switch 73 comes against the contact 75 and causes current to flow through the contact bridge 78. If, for example, after this rotation to the left the contact bridge 78 touches the three left switch contacts 66, then the three right-hand contact pieces 61 of the slide path 60 are energized and the drive motor 62 changes its direction of rotation and causes the drive rod 65 to travel back into the positioning member 62. This inward travel continues until the slider 68, on account of the kinetic energy of the drive rod 65, has overshot the last current carrying contact and thereby causes the circuit to be interrupted. In this new end position the headlight 10 linked to the drive rod 65 now takes a new elevation orientation corresponding to the vehicle loading.

Although the invention has been described with respect to specific illustrated embodiments, it will be understood that variation and modifications are possible within the inventive concept.

We claim:

1. A load compensating headlight directing system for a vehicle comprising:
   a vertical plane directional positioning member for each headlight, and
   a command transmitter for applying electrical potential to one or more of a plurality of electrical conductors collectively representative of an angular position order for said positioning member,
   said positioning member (12,62) having a positioning drive device constituted so as to be responsive to angular position orders provided on said conductors and also so constituted on account of the inertia of the moving parts thereof, to shut itself off automatically after responding to an angular position order.

2. A headlight directing system for a vehicle as defined in claim 1, in which said command transmitter is a step switch (13,53,63) and in which said positioning drive device (12,62) has a slide-contact path provided with mutually insulated contacts (21,61) and also has a drive rod (15,65) having a slide-contact part (18,68) for a slider blade making contact with said contacts.

3. A headlight directing system for a vehicle as defined in claim 2, in which said positioning drive device comprises an electrically heatable expansion chamber drive (14) and in which said drive rod (15) carries said slidecontact part (18), and in which, further, said slider part and a heating winding for said expansion chamber drive (14) are connected in a circuit which is switchable by said command transmitter.

4. A headlight directing system for a vehicle as defined in claim 2, in which said step switch (13,53,63) has a plurality of switching contacts (26,66) that are switchable by a contact bridge (28,78), each of said switching contacts being electrically connected to a switching contact (21,61) of said slide-contact path (20,60) by one of said conductors.

5. A headlight directing system for a vehicle as defined in claim 4, in which said contact bridge (28,78) of said step switch (13,63) is constituted as a manually controllable, rotatable component (41) having a normal position, at least one "forward axle loaded" switching position, and at least one "rear axle loaded" switching position.

6. A headlight directing system for a vehicle, as defined in claim 4, in which the relative position of the switching contacts (26,66), and of the contact bridge (28,78) of said step switch is controlled by the distance between a fixed location of a variably supported vehicle body where said step switch is mounted and the rear axle of said vehicle.

7. A headlight directing system for a vehicle, as defined in claim 6, in which there is also provided a second step switch, likewise having a plurality of switching contacts that are switchable by a contact bridge, in which the position of the contact bridge with respect to the switching contacts is dependent on the distance between a location on the vehicle body where the second step switch is located and the front axle of the vehicle, and in which system an adding circuit (55) is provided, to a first set of inputs of which the switching contacts of the first step switch are connected and to another set of inputs of which the switching contacts of the second step switch are connected, so constituted as to provide signals on a set of outputs connected to the slide path contact arrays of the positioning drive devices for the headlights and representing an addition of the input signals of the adding circuit, the sense of addition being such as to add a lengthening of the distance to one axle with a shortening of the distance to the other.

8. A headlight directing system for a vehicle, as defined in claim 2, in which said positioning drive device comprises an electrice drive motor (62) having a drive rod (65) arranged to be driven forward and back respectively by oppositely directed rotational movements of said motor (62), and having separate slider contacts (18,68) respectively energizable during oppositely directed operations of said motor, each of said slider contacts cooperating with a slide-switch path (20,60) and in which system, further, said step switch (63) has first and second contact bridges (28,78), of which said first contact bridge successively switches the switching contacts for one direction of motor operation and the second contact bridge successively switches the switching contact for the other direction of operation of said motor (62).

9. A headlight directing system for a vehicle, as defined in claim 8, in which both said contact bridges (28,78) are mounted on a disk (67) and a reversing switch (73) responsive to the previous direction of rotation of said disk (67) is arranged to complete, alternatively, the respective circuits for opposite directions of operation of said motor (62).

10. A headlight directing system for a vehicle, as defined in claim 9, in which said disk (67) is provided with circumferentially disposed catch teeth (71) between neighboring teeth of which a catch tongue (72) of said reversing switch (73) engages.

11. A headlight directing system for a vehicle, as defined in claim 8, in which said step switch (63) is provided with a manual control rotor (41) having scale divisions designating inclination.

12. A headlight directing system for a vehicle, as defined in claim 8, in which said step switch (63) is constituted as an automatic fore-and-aft vehicle trim transducer utilizing the wheel-base of the vehicle to provide a reference orientation.

* * * * *